US010291007B2

(12) United States Patent
Smith et al.

(10) Patent No.: US 10,291,007 B2
(45) Date of Patent: May 14, 2019

(54) ACTIVE COVER PLATES (71) Applicants: Jeremy C. Smith, Orem, UT (US); R. Camden Robinson, Lindon, UT (US)

(72) Inventors: Jeremy C. Smith, Orem, UT (US); R. Camden Robinson, Lindon, UT (US)

(73) Assignee: SnapRays LLC, Vineyard, UT (US)

( * ) Notice: Subject to any disclaimer, the term of this patent is extended or adjusted under 35 U.S.C. 154(b) by 0 days.

(21) Appl. No.: 15/496,872

(22) Filed: Apr. 25, 2017

(65) Prior Publication Data

US 2017/0229853 A1 Aug. 10, 2017

Related U.S. Application Data (63) Continuation of application No. 15/145,749, filed on May 3, 2016, now Pat. No. 9,787,025, which is a continuation-in-part of application No. 14/549,143, filed on Nov. 20, 2014, now Pat. No. 9,362,728, which is a continuation-in-part of application No. 14/066,621, filed on Oct. 29, 2013, now Pat. No. 9,035,180.

(60) Provisional application No. 61/720,131, filed on Oct. 30, 2012.

(51) Int. Cl.
*H02G 3/00* (2006.01)
*H02G 3/14* (2006.01)

(52) U.S. Cl.
CPC ..................... *H02G 3/14* (2013.01)

(58) Field of Classification Search
CPC ........ H02G 3/14; H02G 3/081; H01H 9/0264; H01H 9/0271; H01H 13/04; H01H 21/04; H01R 13/44; H05B 37/0218; H05B 33/0842; H02B 1/46
See application file for complete search history.

(56) References Cited

U.S. PATENT DOCUMENTS

| 2,015,698 A | 10/1935 | Tiffany |
| 2,227,549 A | 1/1941 | McNeill |
| 2,385,620 A | 9/1945 | Fleckenstein |
| 2,428,167 A | 9/1947 | Linton |
| 2,515,820 A | 7/1950 | Clark |
| 2,575,820 A | 11/1951 | Linton |
| 2,580,056 A | 12/1951 | Wheeler, Jr. |
| 2,749,381 A | 6/1956 | Farish |
| 2,880,285 A | 3/1959 | Robison et al. |
| 2,908,743 A | 10/1959 | Premoshis |
| 2,934,590 A | 4/1960 | Thompson et al. |

(Continued)

FOREIGN PATENT DOCUMENTS

| CA | 2732657 | 8/2012 |
| DE | 202006006354 | 10/2007 |

(Continued)

OTHER PUBLICATIONS

Plate Pals Wallplate Thermometers, http://www.platepals.com/ last visited Apr. 21, 2017, 2006.

*Primary Examiner* — Pete T Lee (57) ABSTRACT

An active cover plate includes a face plate, a load and an electrically insulated power extractor extending rearward from the face plate to interface with an electrical receptacle, wherein the power extractor extracts electrical power from the electrical receptacle to energize the load. A method for installing an active cover plate on an electrical receptacle is also provided.

18 Claims, 4 Drawing Sheets (56) References Cited

U.S. PATENT DOCUMENTS

| | | |
|---|---|---|
| 3,120,414 A | 2/1964 | Farish, Jr. |
| 3,307,030 A | 2/1967 | Francisco |
| D212,760 S | 11/1968 | Bordner |
| 3,522,595 A | 8/1970 | White |
| 3,588,489 A | 6/1971 | Gaines |
| 3,680,237 A | 8/1972 | Finnerty, Sr. |
| 3,739,226 A | 6/1973 | Seiter et al. |
| D230,274 S | 2/1974 | Polus |
| 3,859,454 A | 1/1975 | Mann |
| 3,879,101 A | 4/1975 | McKissic |
| 4,000,405 A | 12/1976 | Horwinski |
| 4,038,582 A | 7/1977 | Horwinski |
| 4,117,258 A | 9/1978 | Shanker |
| 4,255,780 A | 3/1981 | Sakellaris |
| 4,282,591 A | 8/1981 | Andreuccetti |
| 4,514,789 A | 4/1985 | Jester |
| 4,534,486 A | 8/1985 | Eidson |
| 4,546,419 A | 10/1985 | Johnson |
| 4,611,264 A | 9/1986 | Bradley |
| 4,616,285 A | 10/1986 | Sackett |
| 4,617,613 A | 10/1986 | Rice |
| 4,755,913 A | 7/1988 | Sleveland |
| 4,774,641 A | 9/1988 | Rice |
| D330,267 S | 10/1992 | Hendrix |
| 5,248,919 A | 9/1993 | Hanna |
| 5,290,175 A | 3/1994 | Robinson |
| 5,384,428 A | 1/1995 | Luu |
| 5,406,439 A | 4/1995 | Crane et al. |
| 5,473,517 A | 12/1995 | Blackman |
| D366,339 S | 1/1996 | Waller |
| 5,481,442 A | 1/1996 | Dickie et al. |
| 5,485,356 A * | 1/1996 | Nguyen .............. H01R 13/717 174/66 |
| 5,622,424 A | 4/1997 | Brady |
| 5,660,459 A | 8/1997 | Appelberg |
| 5,670,776 A | 9/1997 | Rothbaum |
| 5,683,166 A | 11/1997 | Lutzker |
| D395,314 S | 6/1998 | Oikawa |
| D399,825 S | 10/1998 | Heung et al. |
| 5,816,682 A | 10/1998 | Marischen |
| D401,566 S | 11/1998 | Gesmondi |
| D407,072 S | 3/1999 | Gaule |
| 5,914,826 A | 6/1999 | Smallwood |
| 6,000,807 A | 12/1999 | Moreland |
| 6,010,228 A | 1/2000 | Blackman |
| 6,023,021 A | 2/2000 | Matthews et al. |
| 6,087,588 A | 7/2000 | Soules |
| 6,089,893 A | 7/2000 | Yu et al. |
| D429,829 S | 8/2000 | Doran |
| 6,390,647 B1 | 5/2002 | Shaefer |
| D464,865 S | 10/2002 | Luu |
| 6,457,843 B1 | 10/2002 | Kester et al. |
| D473,528 S | 4/2003 | Wengrower |
| 6,547,411 B1 | 4/2003 | Dornbusch |
| 6,765,149 B1 | 7/2004 | Ku |
| 6,805,469 B1 | 10/2004 | Barton |
| 6,808,283 B2 | 10/2004 | Tsao |
| D500,743 S | 1/2005 | Savicki, Jr. et al. |
| 6,974,910 B2 | 12/2005 | Rohmer |
| 7,011,422 B2 | 3/2006 | Robertson et al. |
| 7,036,948 B1 | 5/2006 | Wyatt |
| 7,064,498 B2 | 6/2006 | Dowling et al. |
| D542,627 S | 5/2007 | Rohmer et al. |
| 7,247,793 B2 | 7/2007 | Hinkson |
| 7,270,436 B2 | 9/2007 | Jasper |
| 7,318,653 B2 | 1/2008 | Chien |
| D567,633 S | 4/2008 | Anderson |
| 7,360,912 B1 | 4/2008 | Savicki, Jr. |
| D576,566 S | 9/2008 | Wu et al. |
| D577,985 S | 10/2008 | Kidman |
| 7,506,990 B2 | 3/2009 | Glazner |
| 7,547,131 B2 | 6/2009 | Faunce et al. |
| 7,576,285 B1 | 8/2009 | Savicki, Jr. |
| D606,029 S | 12/2009 | Chou |
| 7,745,750 B2 | 6/2010 | Hewson et al. |
| 7,821,160 B1 | 10/2010 | Roosli et al. |
| 7,918,667 B1 * | 4/2011 | Shim .................. H01R 13/7037 439/39 |
| 7,946,871 B1 | 5/2011 | Yu et al. |
| 8,003,886 B1 | 8/2011 | Rintz |
| D650,112 S | 12/2011 | Bryant |
| 8,148,637 B2 | 4/2012 | Davidson |
| 8,304,652 B2 | 11/2012 | McBain |
| 8,393,747 B2 | 3/2013 | Kevelos et al. |
| 8,511,866 B1 | 8/2013 | Mendez |
| 8,564,279 B2 | 10/2013 | Johnson et al. |
| 8,668,347 B2 | 3/2014 | Ebeling |
| 8,697,991 B2 | 4/2014 | Davidson |
| D719,699 S | 12/2014 | Bryant |
| 9,482,426 B2 | 11/2016 | Diotte |
| 2001/0046130 A1 | 11/2001 | Cunningham et al. |
| 2003/0013503 A1 | 1/2003 | Menard et al. |
| 2003/0124022 A1 | 7/2003 | Georges et al. |
| 2004/0247300 A1 | 12/2004 | He et al. |
| 2005/0264383 A1 | 12/2005 | Zhang |
| 2006/0065510 A1 | 3/2006 | Kiko et al. |
| 2006/0072302 A1 | 4/2006 | Chien |
| 2006/0077684 A1 | 4/2006 | Yeun |
| 2006/0161270 A1 | 7/2006 | Luskin et al. |
| 2006/0170380 A1 | 8/2006 | Evans |
| 2006/0262462 A1 | 11/2006 | Barton |
| 2008/0073117 A1 | 3/2008 | Misener |
| 2008/0266121 A1 | 10/2008 | Ellul |
| 2009/0153438 A1 | 6/2009 | Miller et al. |
| 2009/0225480 A1 | 9/2009 | Baxter |
| 2009/0284385 A1 | 11/2009 | Tang et al. |
| 2009/0322159 A1 | 12/2009 | DuBose et al. |
| 2011/0056720 A1 | 3/2011 | Davidson |
| 2011/0210833 A1 | 9/2011 | McNeely et al. |
| 2012/0008307 A1 | 1/2012 | Delany |
| 2012/0156937 A1 | 6/2012 | Almouli |
| 2012/0182172 A1 | 7/2012 | Sorensen |
| 2012/0215470 A1 | 8/2012 | Maguire |
| 2012/0316808 A1 | 12/2012 | Frader-Thompson et al. |
| 2013/0063848 A1 | 3/2013 | Thorpe et al. |
| 2013/0221868 A1 | 8/2013 | Diotte et al. |
| 2014/0000927 A1 * | 1/2014 | Hashimoto ............ H02G 5/005 174/68.2 |
| 2015/0104676 A1 * | 4/2015 | Okada .................. H01M 2/206 429/7 |
| 2015/0371534 A1 | 12/2015 | Dimberg et al. |

FOREIGN PATENT DOCUMENTS

| | | |
|---|---|---|
| EP | 2211210 | 3/2007 |
| KR | 1019930025223 | 6/1995 |
| KR | 1020080047328 | 11/2009 |
| KR | 1020090098056 | 4/2010 |
| WO | 2007122141 | 11/2007 |
| WO | 2012006812 | 1/2012 |

* cited by examiner

ACTIVE COVER PLATES

RELATED APPLICATIONS

The present application is a continuation of U.S. patent application Ser. No. 15/145,749 filed May 3, 2016, which incorporates by reference and is a continuation-in-part of U.S. patent application Ser. No. 14/549,143 filed Nov. 20, 2014 (issued Jun. 7, 2016 as U.S. Pat. No. 9,362,728), which incorporates by reference and is a continuation-in-part of U.S. patent application Ser. No. 14/066,621 filed Oct. 29, 2013 (issued May 19, 2015 as U.S. Pat. No. 9,035,180), which incorporates by reference and claims the benefit of U.S. Provisional Patent Application Ser. No. 61/720,131 filed Oct. 30, 2012. The foregoing patent applications and patents are each hereby incorporated by reference in their entireties.

BACKGROUND

Devices intended for prolonged use in electrical outlets are quite common. For example, many people have nightlights that are plugged into a particular outlet and remain there. These nightlights provide a low light level in a particular area in order to provide visibility either at night or in when ambient conditions do not provide adequate lighting.

However, nightlights suffer from a number of drawbacks. For example, they require an outlet in the area (i.e., a nightlight cannot be placed, higher or lower than an electrical outlet, near an electrical switch, or in many other areas that a user may desire its installation). Thus, in numerous locations, either brighter light must be used or a nightlight will not be possible for installation (i.e., only areas with available outlets are able to provide lighting, irrespective of user preferences and needs).

In addition, the installation of a nightlight blocks one or both outlets available at a receptacle. Once the nightlight is plugged into an outlet, that space becomes unavailable for other devices. If the user wishes to use the outlet, he/she must unplug the nightlight to free the outlet, which forces the user to select one or the other for use. Some nightlights have a built in outlet allowing other devices to be plugged into the nightlight, and thus receive power from the outlet. However, the nightlight may require a certain level of power that limits the functionality of other devices.

Of necessity, nightlights protrude from the outlet. This may result in the nightlight being bumped or otherwise displaced and can cause harm to the person bumping into the nightlight or to the nightlight itself. In addition, it may partially unplug the nightlight, creating an electrocution or fire hazard.

Direct wiring to the nightlight is possible. For example, the nightlight can be wired directly to electrical power without using a plug. However, this makes installation and replacement time consuming and dangerous. For example, if the wiring is not done correctly there can be a danger of electrocution or a fire hazard.

Accordingly, there is a need in the art for an active cover plate that does not protrude from an outlet. In addition, there is a need in the art for the cover plate to be easily installed or replaced. Further, there is a need in the art for the cover plate to be available for installation at other receptacle types, such as switches. There is a need in the art for the cover plate to leave outlets free for other uses.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Reference will now be made to the figures wherein like structures will be provided with like reference designations. In the following description, for purposes of explanation, numerous specific details are set forth in order to provide a thorough understanding of the present systems and methods. It will be apparent, however, to one skilled in the art that the present apparatus, systems and methods may be practiced without these specific details. It is understood that the figures are diagrammatic and schematic representations of some embodiments of the invention, and are not limiting of the present invention, nor are they necessarily drawn to scale. Reference in the specification to "an example" or similar language means that a particular feature, structure, or characteristic described in connection with the example is included in at least that one example, but not necessarily in other examples.

Figure 1:
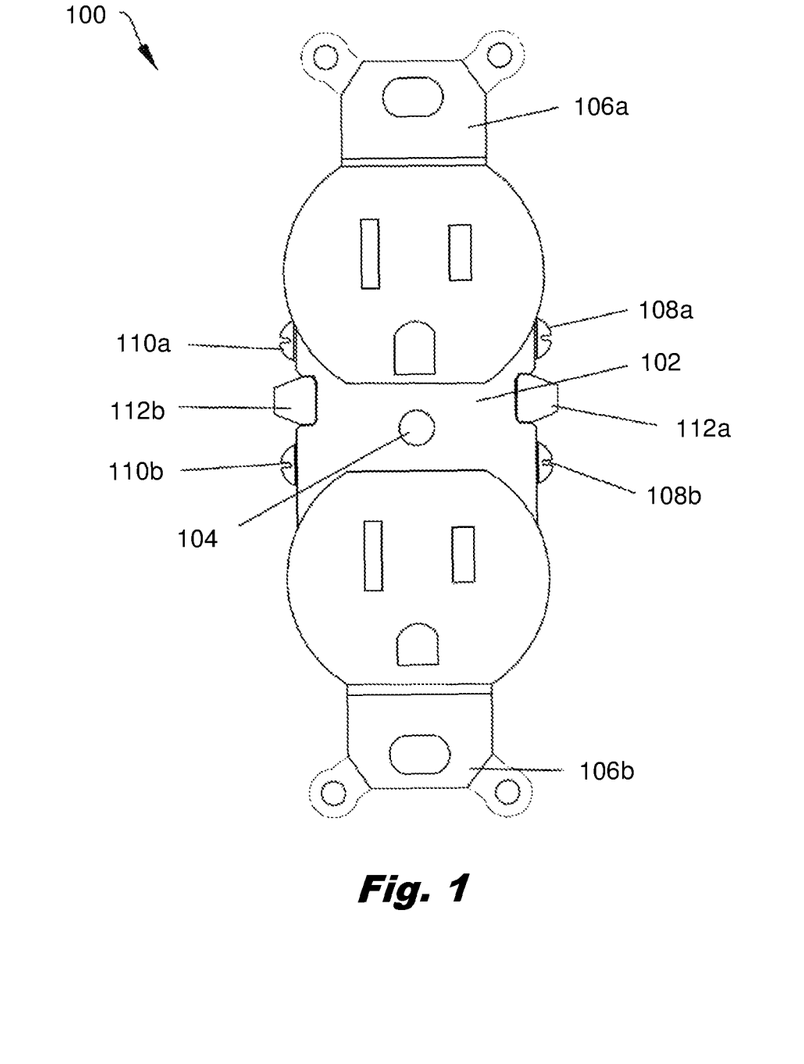
FIG. 1 is a front view of outlet receptacle, according to one example of principles described herein.

FIG. 1 illustrates an example of an outlet (100). In at least one implementation, the outlet (100) can provide power to an external device. That is, the outlet (100) is configured to receive a plug of an external device and provide power to the plug. The outlet (100) can be direct wired to an electrical power source. For example, the outlet (100) can be placed within a home or business, with wiring from the building power supply.

FIG. 1 shows that the outlet (100) can include a body (102). In at least one implementation, the body (102) is configured to receive a plug from an external device. For example, the body (102) includes sockets that allow the conducting leads of a plug to be inserted and make contact which allows current flow to the plug but prevents current flow to anything other than the plug. The body (102) can include multiple sockets, each of which is configured to receive a plug.

FIG. 1 also shows that the outlet (100) can include a bore (104). In at least one implementation, the bore (104) is configured to receive the attachment of a cover plate. In particular, the bore (104) can allow the attachment of the cover plate to secure the cover plate relative to the outlet (100). For example, the bore (104) can include a threaded opening for receiving a screw or any other device for the cover plate attachment. The cover plate can be configured to mate with the body (102) in order to maintain the proper orientation, such that a single bore (104) can retain the cover plate.

FIG. 1 further shows that the outlet (100) can include a first mounting piece (106a) and a second mounting piece (106b) (collectively "mounting pieces 106"). In at least one implementation, the mounting pieces (106) are configured to attach the outlet (100) to an electrical box. For example, the mounting pieces (106) secure the outlet (100) in place, ensuring that it does not move or otherwise reorient as the user attempts to insert or remove a plug from the body (102). The mounting pieces (106) can include "yokes" or tabs that are configured to prevent the outlet (100) from being installed too deeply into the electrical box. For example, the yokes can keep the mounting pieces (106) approximately flush with the wall during installation.

FIG. 1 additionally shows that the outlet (100) can include a first power screw (108*a*) and a second power screw (108*b*) (collectively "power screws 108"). In at least one implementation, the power screws (108) allow the outlet (100) to be connected to an active power source. Additionally or alternatively, the power screws (108) can allow the outlet (100) to be connected to other active loads, such as switches, additional outlets or any other active load. The outlet (100) may include power inputs that allow a wire to be inserted directly without the need to attach the wire to the power screws (108).

FIG. 1 also shows that the outlet (100) can include a first neutral screw (110*a*) and a second neutral screw (110*b*) (collectively "neutral screws 110"). In at least one implementation, the neutral screws (110) return power to the power source, completing the electrical circuit. For example, power flows from the power source to the power screws (108), through the external device via the plug, to the neutral screws (110) and back to the power source forming an electrical circuit. Additionally or alternatively, the neutral screws (110) can allow the outlet (100) to be connected to other active loads, such as switches, additional outlets or any other active load. The outlet (100) may include power inputs that allow a wire to be inserted directly without the need to attach the wire to the neutral screws (110). One of skill in the art will appreciate that such inputs remain connected to the neutral screws (110) such that a wire from another active load and connected to the neutral screws (110) is able to provide power to the additional active load.

One of skill in the art will appreciate that the power screws (108) and the neutral screws (110) can be of any desired voltage. For example, voltage can include 100 V, 120 V, 220 V, 230 V or any other desired voltage. That is, the voltage between the power screws (108) and the neutral screws (110) can accommodate any voltage preference or standard.

FIG. 1 further shows that the outlet (100) can include powered terminals that comprise conductive tabs (112) and screws (108, 110). The connecting tabs (112) allow a single wire to be connected to the outlet (100) and power both of the adjacent screws. For example, the first connecting tab (112*a*) connects the first power screw (108*a*) and the second power screw (108*b*) such that a wire connected to the first power screw (108*a*) is also connected to the second power screw (108*b*) and vice versa. Likewise, the second connecting tab (112*b*) connects the first neutral screw (110*a*) and the second neutral screw (108*b*) such that a wire connected to the first neutral screw (110*a*) is also connected to the second neutral screw (110*b*) and vice versa.

The first connecting tab (112*a*), the second connecting tab (112*b*) or both can be removed during installation when connection between the adjoining screws is desired. Removal of the first connecting tab (112*a*) allows separate power inputs to the first power screw (108*a*) and the second power screw (108*b*). Likewise, removal of the second connecting tab (112*b*) allows separate neutral connections to the first neutral screw (110*a*) and the second neutral screw (110*b*). Separate connections may be desirable if the different sockets are to be placed on separate circuits, operated with a switch or should otherwise be independent of one another.

Figure 2A:
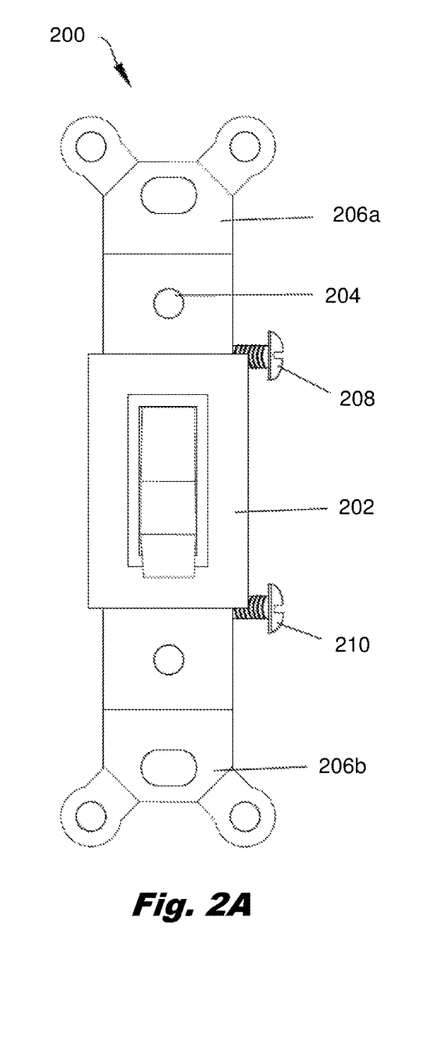
FIG. 2A is a front view of a single pole light switch, according to one example of principles described herein.

FIG. 2A illustrates an example of a switch (200). In at least one implementation, the switch (200) can provide power to an external device that a user desires to turn on and off. For example, the switch (200) may be configured to allow a user to control whether a device connected to the switch is on or off. The switch (200) can be hardwired to the device or can be connected via an outlet and plug or through some other indirect connection.

FIG. 2A shows that the switch (200) can include a body (202). In at least one implementation, the body (202) can include a movable portion that allows the user to control the state of the connected electrical device. For example, the body (202) can include a toggle, which can be moved as desired to change the on/off state of the connected electrical device. Additionally or alternatively, the body (202) can include a button, or touch screen or some other mechanism for detecting user control.

FIG. 2A also shows that the switch (200) can include a bore (204). In at least one implementation, the bore (204) is configured to receive the attachment of a cover plate. In particular, the bore (204) can allow the attachment of the cover plate to secure the cover plate relative to the switch (200). For example, the bore (204) can include a threaded opening for receiving a screw or any other device for the cover plate attachment. The cover plate can be configured to mate with the body (202) in order to maintain the proper orientation.

FIG. 2A further shows that the switch (200) can include a first mounting piece (206*a*) and a second mounting piece (206*b*) (collectively "mounting pieces 206"). In at least one implementation, the mounting pieces (206) are configured to attach the switch (200) to an electrical box. That is, the mounting pieces (206) secure the switch (200) in place, ensuring that it does not move or otherwise reorient as the user operates the portion of the body (202) which allows the user to change the on/off state of the connected electrical device. The mounting pieces (206) can include "yokes" or tabs that are configured to prevent the switch (200) from being installed too deeply into the electrical box. That is, the yokes can keep the mounting pieces (206) approximately flush with the wall during installation.

FIG. 2A additionally shows that the switch (200) can include a power screw (208). In at least one implementation, the power screw (208) allows the switch (200) to be connected to an active power source. Additionally or alternatively, the power screw (208) can allow the switch (200) to be connected to other active loads, such as additional switches, outlets or any other active load. The switch (200) may include a power input that allows a wire to be inserted directly without the need to attach the wire to the power screw (208). One of skill in the art will appreciate that such inputs remain connected to the power screw (208) such that a wire from another active load and connected to the power screw (208) is able to provide power to the additional active load.

FIG. 2A also shows that the switch (200) can include a neutral screw (210). In at least one implementation, the neutral screw (210) returns power to the power source, completing the electrical circuit. That is, power flows from the power source to the power screw (208), through the switch, to the neutral screw (210) and back to the power source forming an electrical circuit. Additionally or alternatively, the neutral screw (210) can allow the switch (200) to be connected to other active loads, such as additional switches, outlets or any other active load. The switch (200)

may include a power input that allows a wire to be inserted directly without the need to attach the wire to the neutral screw (210).

The electrical energy supplied by the power screw (208) and the neutral screw (210) can be at any of a number of voltages. For example, voltage can include 100 V, 120 V, 220 V, 230 V or any other desired voltage. The voltage between the power screw (208) and the neutral screw (210) can accommodate any voltage preference or standard.

Figure 2B:
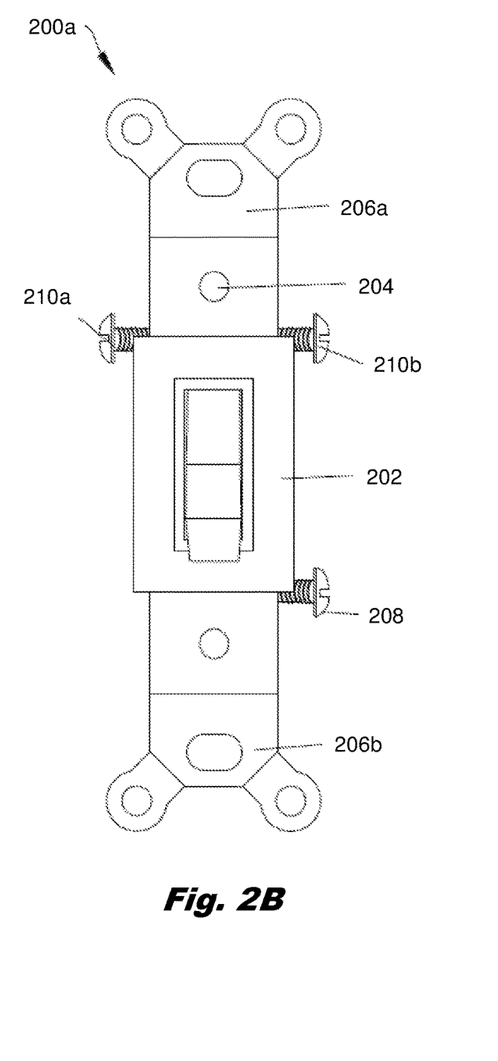
FIG. 2B is a front view of a three way light switch, according to one example of principles described herein.

FIG. 2B illustrates an example of a 3-way switch (200a). In at least one implementation, the 3-way switch (200a) can provide power to an external device which a user desires to turn on and off in combination with another switch (i.e., the 3-way switch (200a) is configured to allow a user to control whether a device connected to the 3-way switch is on or off). The device is on when both switches are in the same configuration and off when both switches are in a different configuration. The 3-way switch (200a) can be hardwired to the device or can be connected via an outlet and plug or though some other indirect connection.

FIG. 2B shows that the 3-way switch (200a) can include a body (202). In at least one implementation, the body (202) can include a movable portion that allows the user to control the state of the connected electrical device. For example, the body (202) can include a toggle, which can be moved as desired to change the on/off state of the connected electrical device. Additionally or alternatively, the body (202) can include a button, or touch screen or some other mechanism for detecting user control.

As discussed above with respect to other outlet and switch embodiments, the 3-way switch (200a) can include a bore (204). In at least one implementation, the bore (204) is configured to receive the attachment of a cover plate. The 3-way switch (200a) may also include a first mounting piece (206a) and a second mounting piece (206b) that are configured to allow the switch to be connected to an electrical box.

FIG. 2B additionally shows that the 3-way switch (200a) can include a power screw (208). In at least one implementation, the power screw (208) allows the 3-way switch (200a) to be connected to an active power source. Additionally or alternatively, the power screw (208) can allow the 3-way switch (200a) to be connected to other active loads, such as additional 3-way switches, outlets or any other active load. The 3-way switch (200a) may include a power input that allows a wire to be inserted directly without the need to attach the wire to the power screw (208).

FIG. 2B also shows that the 3-way switch (200a) can include a first neutral screw (210a) and a second neutral screw (210b) (collectively "neutral screws 210"). In at least one implementation, the neutral screws (210) return power to the power source, completing the electrical circuit. Power flows from the power source to the power screw (208), through the 3-way switch, to either the first neutral screw (210a) or the second neutral screw (210b) to the other 3-way switch through the electrical device and back to the power source forming an electrical circuit.

Figure 3A:
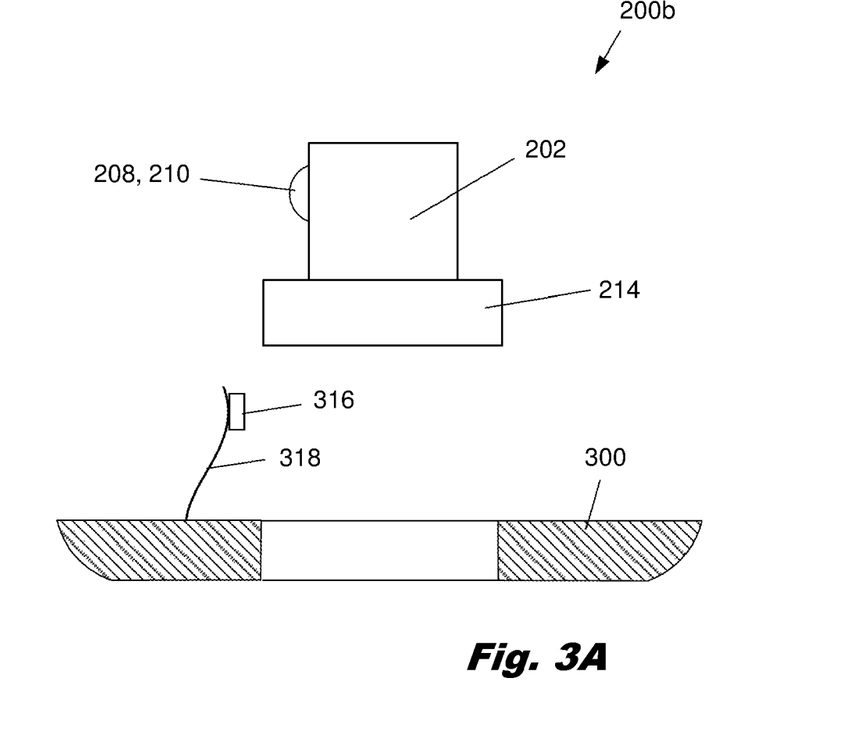
FIGS. 3A-3C are illustrative examples of an active cover plate with magnetic contacts, according to one example of principles described herein.
Figure 3B:
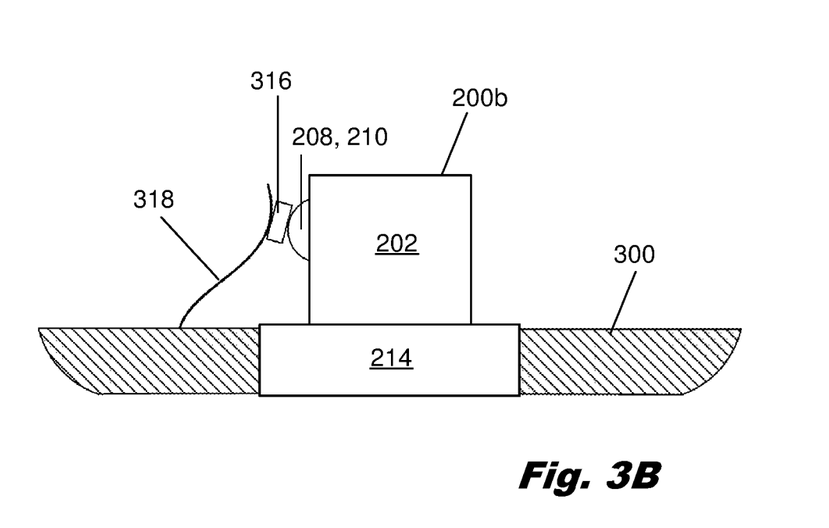

FIGS. 3A and 3B show an active cover plate (300) that uses a magnetic force to ensure contact with the screw terminals (108, 110, 208, 210). The location of screw terminals (108, 110, 208, 210) on some outlet/switch bodies (102, 202) can be difficult to make contact with. For example, a Decora single throw switch (200b) has a large face portion (214) and a relative narrow body portion (202) behind the face portion. This creates an overhang that hides the screw terminals (208, 210).

As the cover plate (300) is placed over the outlet/switch body (102, 202) the magnet (316) is attracted to the screw and screw terminal (108, 110, 208, 210). This bends the flexible conductor (318) around the overhang and brings it into electrical contact with the screw terminal (108, 110, 208, 210). The electricity may pass around the magnet (316) or through the magnet (316). In some examples, the magnet (316) may sandwich the conductor (318) between itself and the screw terminal (108, 110, 208, 210). A wide variety of magnets (316) could be used, including plastic, ceramic, rare earth, metal, or other types of magnets (316).

A particular mounting procedure may be beneficial for installing an active cover plate (300) with magnetic power extractors. For example, the user could place a cover plate (300) at an angle relative to the outlet body (102), with the side of the cover plate (300) containing the flexible conductors/magnets (316, 618) closer to the wall than the opposite side. This places the flexible conductor/magnet (316, 318) at a favorable angle to be in close proximity to the conductive screws (108, 110) as the cover plate (300) placed over the outlet cover. After the magnets (316) make electrical contact between the screw terminals (108, 110) and the flexible conductor (318), the cover plate (300) is connected to the outlet body (102).

Figure 3C:
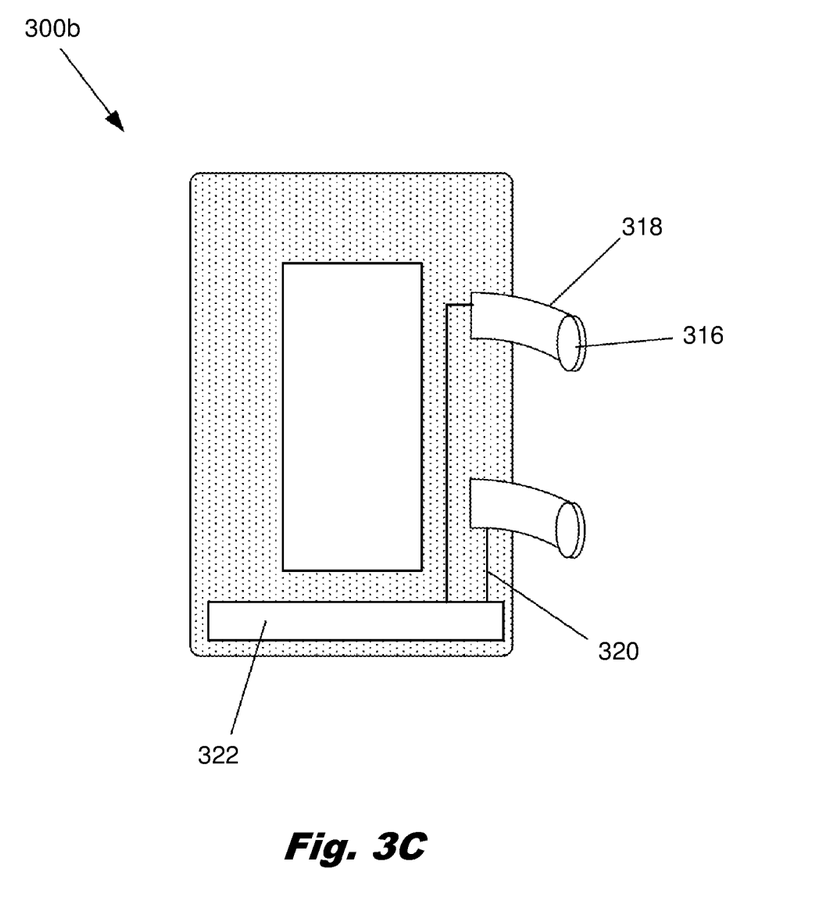

FIG. 3C shows one view of an illustrative active cover plate (300a) that uses an insulated ribbon cable as the flexible conductor (318) with a magnetic contact (316) at its terminal end. The ribbon cable may be much wider than it is thick. For example, the ribbon cable may be 5 to 15 millimeters wide and only about 1 millimeter thick. This allows the ribbon cable to support the weight of the magnet/contact (316) without flopping downward while still allowing the ribbon cable to easily swing inward toward the screw terminal (108, 110, 208, 210) under the influence of magnetic attraction between the magnet (316) to the screw/screw terminal (108, 110, 208, 210). The ribbon cable may have a single conductor (318) passing down its length or many have multiple conductors (318). Conductors (320) are connected to the ribbon cables and conduct electricity between the flexible conductors/magnet/contact (316, 318) and the circuit board (322).

In one example, an active cover plate (300) comprises: a faceplate; a load; and an electrically insulated power extractor extending rearward from the faceplate to interface with an electrical receptacle (100), wherein the power extractor extracts electrical power from the electrical receptacle (100) to energize the load. In another example, an active cover plate (300) comprises: a faceplate; a load; and at least two power extractors extending rearward from the faceplate to interface with an electrical receptacle (100), wherein the power extractors comprise a flexible conductive ribbon (318) connected to the face plate on a first end and magnetic electrical contact (316) connected to an opposite end of the flexible conductive ribbon (318), wherein the power extractors extract electrical power from the electrical receptacle (100) to energize the load.

In at least one implementation, the load can include any electrical device that requires power. For example, the load can include an electrical device embedded within the cover plate. For example, the load can include lights, motion detectors, photocells, wireless nodes, blue tooth connectors, smoke detectors, carbon monoxide detectors, cameras, heat detectors, speakers, microphones or any other desired electrical device. In one example, a load includes a bank of light-emitting diodes.

The preceding description has been presented only to illustrate and describe examples of the principles described. This description is not intended to be exhaustive or to limit these principles to any precise form disclosed. Many modifications and variations are possible in light of the above teaching.

What is claimed is:

1. An active cover plate comprising:
a face plate having a length in a vertical direction and a width in a horizontal direction;
a load;
a first magnet;
a first electrically insulated power extractor extending rearward from the face plate to tap electrical power from an electrical receptacle and energize the load;
the first electrically insulated power extractor tethering the first magnet to the face plate and comprising a fixed end fixed with respect to the face plate and an opposite free end connected to the first magnet; and
the first electrically insulated power extractor comprising a ribbon of flexible dielectric material and a flexible metal wire embedded within the ribbon, the ribbon having a width in the vertical direction and a thickness in the horizontal direction, the width of the ribbon being at least two times greater than the thickness of the ribbon.

2. The active cover plate of claim 1, further comprising a second magnet.

3. The active cover plate of claim 2, further comprising a second electrically insulated power extractor.

4. The active cover plate of claim 3, wherein the first and second electrically insulated power extractors collectively tap electrical power from the electrical receptacle to energize the load.

5. The active cover plate of claim 4, wherein the second electrically insulated power extractor tethers the second magnet to the face plate and comprises a fixed end fixed with respect to the face plate and an opposite, free end connected to the second magnet.

6. The active cover plate of claim 5, wherein:
the first magnet contacts a first terminal of the electrical receptacle; and
the second magnet contacts a second terminal of the electrical receptacle.

7. The active cover plate of claim 6, wherein:
a first magnetic attraction biases the first magnet toward the first terminal; and
a second magnetic attraction biases the second magnet toward the second terminal.

8. A wall-plate system comprising:
a face plate comprising a front and a back and having a length in a vertical direction and a width in a horizontal direction;
electronic circuitry positioned adjacent the back of the face plate;
a first magnet;
a first conductor tethering the first magnet to the electronic circuitry and having a first end connected to the electronic circuitry and a second end connected to the first magnet;
a ribbon of flexible dielectric material extending between the back of the face plate and the first magnet;
the first conductor comprising a flexible metal wire embedded within the ribbon; and
the ribbon having a width in the vertical direction and a thickness in the horizontal direction, the width of the ribbon being at least two times greater than the thickness of the ribbon.

9. The wall-plate system of claim 8, wherein the face plate further comprises a rectangular outer perimeter forming lengthwise and widthwise extremes of the face plate in the vertical and horizontal directions, respectively.

10. The wall-plate system of claim 9, wherein the electronic circuitry is circumscribed by the rectangular outer perimeter of the face plate.

11. The wall-plate system of claim 10, wherein the electronic circuitry comprises at least one light.

12. The wall-plate system of claim 11, further comprising a second magnet and a second conductor.

13. The wall-plate system of claim 12, wherein the second conductor tethers the second magnet to the electronic circuitry and has a first end connected to the electronic circuitry and a second end connected to the second magnet.

14. The wall-plate system of claim 13, further comprising an electrical outlet secured to the face plate.

15. The wall-plate system of claim 14, wherein:
a first magnetic attraction maintains the first magnet in contract with a first terminal of the electrical outlet;
a second magnetic attraction maintains the second magnet in contract with a second terminal of the electrical outlet the second magnet contacts a second terminal of the electrical outlet; and
the first and second conductors collectively tap electrical power from the electrical outlet to energize the at least one light.

16. A lighting system extending in longitudinal, lateral, and transverse directions that are orthogonal to one another, the lighting system comprising:
an electrical device having first and second terminals;
a face plate secured to the electrical device and comprising a front, a back, and at least one aperture, wherein the at least one aperture surrounds at least a portion of the electrical device that extends therethrough in the transverse direction;
electronic circuitry positioned adjacent the back of the face plate, the electrical circuitry comprising at least one light;
a first magnet held by magnetism in contact with the first terminal of the electrical outlet;
a second magnet held by magnetism in contact with the second terminal of the electrical outlet;
a first conductor tethering the first magnet to the electronic circuitry and having a fixed end fixed with respect to the electronic circuitry and a second, free end connected to the first magnet;
a second conductor tethering the second magnet to the electronic circuitry and having a fixed end fixed with respect to the electronic circuitry and a second, free end connected to the second magnet;
first and second ribbons of flexible dielectric material extending in the transverse direction between the back of the face plate and the first and second magnets, respectively;
the first and second ribbons each have a width and a thickness, the width being at least two times greater than the thickness for each of the first and second ribbons;
the first conductor comprising a first flexible metal wire embedded within the first ribbon;
the second conductor comprising a second flexible metal wire embedded within the second ribbon; and
the first and second conductors collectively tapping electrical power from the electrical device to energize the at least one light.

17. The lighting system of claim 16, wherein the electrical device is an electrical outlet or an electrical switch.

18. The lighting system of claim 17, wherein:
the face plate further comprises a rectangular outer perimeter forming lengthwise and widthwise extremes of the face plate in the longitudinal and lateral directions, respectively; and
the electronic circuitry is circumscribed by the rectangular outer perimeter of the face plate.

\* \* \* \* \*